US009766487B2

(12) United States Patent
Liu

(10) Patent No.: US 9,766,487 B2
(45) Date of Patent: Sep. 19, 2017

(54) CURVED LIQUID CRYSTAL DISPLAY DEVICE

(71) Applicant: Shenzhen China Star Optoelectronics Technology Co., Ltd., Shenzhen, Guangdong (CN)

(72) Inventor: Yawei Liu, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 300 days.

(21) Appl. No.: 14/429,350

(22) PCT Filed: Feb. 9, 2015

(86) PCT No.: PCT/CN2015/072499
§ 371 (c)(1),
(2) Date: Mar. 18, 2015

(87) PCT Pub. No.: WO2016/095333
PCT Pub. Date: Jun. 23, 2016

(65) Prior Publication Data
US 2016/0342014 A1    Nov. 24, 2016

(30) Foreign Application Priority Data
Dec. 15, 2014 (CN) .......................... 2014 1 0778386

(51) Int. Cl.
*G02F 1/1333* (2006.01)
*G02F 1/1335* (2006.01)
*G02F 1/1368* (2006.01)

(52) U.S. Cl.
CPC ...... *G02F 1/133308* (2013.01); *G02F 1/1368* (2013.01); *G02F 1/133514* (2013.01);
(Continued)

(58) Field of Classification Search
None
See application file for complete search history.

(56) References Cited

U.S. PATENT DOCUMENTS

2002/0172039 A1* 11/2002 Inditsky ............... G02B 6/0021
362/231
2008/0137272 A1* 6/2008 Cheng ............... G02F 1/133308
361/679.01
(Continued)

FOREIGN PATENT DOCUMENTS

CN          103810942 A       5/2014
JP     WO 2015087518 A1 *    6/2015 ............... G09F 9/30

Primary Examiner — Dennis Y Kim
(74) Attorney, Agent, or Firm — Andrew C. Cheng

(57) ABSTRACT

The present invention provides a curved liquid crystal display device, which includes a curved backplane (3), a light guide plate (31) arranged on the curved backplane (3), a mold frame (2) mounted to the curved backplane (3), and a liquid crystal panel (1) bonded to the mold frame (2). The curved backplane (3) is in the form of a shell, which has two opposite inside walls that are respectively provided with a plurality of raised sections (32). The mold frame (2) includes two coupling sections (21) respectively formed at two opposite sides of a top portion thereof and a plurality of recessed grooves (22) formed in two opposite sides of a bottom portion thereof and having openings facing outward. The liquid crystal panel (1) is bonded to the coupling sections (21). The plurality of raised sections (32) are respectively received and retained in the plurality of recessed grooves (22) so as to fix the mold frame (2) to the curved backplane (3). The liquid crystal panel (1) is forced by the mold frame (2) to curve in a downward direction to have the liquid crystal panel (1) and the curved backplane (3) show identical curvatures.

11 Claims, 2 Drawing Sheets

(52) U.S. Cl.
CPC ............... *G02F 1/133528* (2013.01); *G02F 2001/133302* (2013.01); *G02F 2001/133314* (2013.01); *G02F 2001/133317* (2013.01); *G02F 2001/133531* (2013.01)

(56) References Cited

U.S. PATENT DOCUMENTS

| | | | |
|---|---|---|---|
| 2012/0113352 A1* | 5/2012 | Bae ................... | G02F 1/133308 349/58 |
| 2014/0133073 A1* | 5/2014 | Ahn ................... | H01L 51/5237 361/679.01 |
| 2016/0041420 A1* | 2/2016 | Takase .............. | G02F 1/133308 361/724 |
| 2016/0309598 A1* | 10/2016 | Yamaguchi ............... | G09F 9/30 |

* cited by examiner

CURVED LIQUID CRYSTAL DISPLAY DEVICE

BACKGROUND OF THE INVENTION

1. Field of the Invention

The present invention relates to the field of displaying technology, and in particular to a curved liquid crystal display device.

2. The Related Arts

Liquid crystal displays (LCDs) have a variety of advantages, such as thin device body, low power consumption, and being free of radiation, and are thus of wide applications, such as liquid crystal televisions, mobile phones, personal digital assistants (PDAs), digital cameras, computer monitors, and notebook computer screens.

The liquid crystal displays generally comprise an enclosure, a liquid crystal panel arranged in the enclosure, and a backlight module mounted in the enclosure. The backlight modules can be classified in two types, namely a side-edge backlight module and a direct backlight module, according to the site where light gets incident. The direct backlight module comprises a light source, such as a cold cathode fluorescent lamp (CCFL) or a light-emitting diode (LED), which is arranged at the backside of the liquid crystal panel, and light is homogenized by a diffuser plate to form a planar light source supplied to the liquid crystal panel. The side-edge backlight module comprises an LED light bar, serving as a backlight source, which is arranged at an edge of a backplane to be located rearward of one side of the liquid crystal panel. The LED light bar emits light that enters a light guide plate (LGP) through a light incident face at one side of the light guide plate and is projected out of a light emergence face of the light guide plate, after being reflected and diffused, to pass through an optic film assembly so as to form a planar light source for the liquid crystal panel.

Recently, with the development of the liquid crystal displaying technology, major manufacturers have marketed curved liquid crystal display devices, such as curved televisions, one after another. Generally speaking, the curved liquid crystal display devices allow for the best viewing effect from the center to the edge of a screen, while a regular liquid crystal display device has generally poor capability of displaying at edges of a screen. The curved liquid crystal display devices has a screen that, in the entirety thereof, has a curved design, showing a wide full-view image, allowing for the same visual enjoyment at both the central portion and the circumferential portion of the screen and also reducing distortion of off-axis viewing for viewing at a short distance. Further, the curved liquid crystal display device allows a viewer's viewing distance to be extended, achieving better experience of viewing. Thus, compared to the regular liquid crystal display devices, the curved liquid crystal display devices have advantages, including: (1) brand differentiating, (2) wider viewable angle, and (3) reducing distortion for short distance viewing.

The conventional curved liquid crystal display devices are generally achieved with measures that are complicated, making the cost relatively high. Thus, it is desired to provide a curved liquid crystal display device that has a simple structure and low cost.

SUMMARY OF THE INVENTION

An object of the present invention is to provide a curved liquid crystal display device, which has a simple structure and low cost, allowing a curved liquid crystal panel to show a predetermined curvature.

To achieve the above object, the present invention provides a curved liquid crystal display device, which comprises a curved backplane, a light guide plate arranged on the curved backplane, a mold frame mounted to the curved backplane, and a liquid crystal panel bonded to the mold frame. The curved backplane is in the form of a shell, which has two opposite inside walls that are respectively provided with a plurality of raised sections. The mold frame comprises two coupling sections respectively formed at two opposite sides of a top portion thereof and a plurality of recessed grooves formed in two opposite sides of a bottom portion thereof and having openings facing outward. The liquid crystal panel is bonded to the coupling sections. The plurality of raised sections is respectively received and retained in the plurality of recessed grooves so as to fix the mold frame to the curved backplane. A linear distance between the two coupling sections formed on the two sides of the top portion of the mold frame is shorter than a length of the liquid crystal panel so that the liquid crystal panel is forced by the mold frame to curve in a downward direction to have the liquid crystal panel and the curved backplane show identical curvatures.

The liquid crystal panel comprises a thin-film transistor (TFT) substrate arranged on the coupling sections, a color filter (CF) substrate opposite to the TFT substrate, liquid crystal between the TFT substrate and the CF substrate, an upper polarizer arranged on an upper surface of the CF substrate, and a lower polarizer arranged on a lower surface of the TFT substrate.

The TFT substrate is a glass substrate.

The CF substrate is a glass substrate.

The upper polarizer and the lower polarizer have polarization axis directions perpendicular to each other.

The curved liquid crystal display device comprises a light-emitting diode (LED) based direct light source or a cold cathode fluorescent lamp (CCFL) based side-edge light source.

The raised sections have trapezoidal cross-sectional shapes and the recessed grooves have interior spaces corresponding in shape to the raised sections.

The curved backplane is made of a stiff material.

The present invention also provides a curved liquid crystal display device, which comprises a curved backplane, a light guide plate arranged on the curved backplane, a mold frame mounted to the curved backplane, and a liquid crystal panel bonded to the mold frame, the curved backplane being in the form of a shell, which has two opposite inside walls that are respectively provided with a plurality of raised sections, the mold frame comprising two coupling sections respectively formed at two opposite sides of a top portion thereof and a plurality of recessed grooves formed in two opposite sides of a bottom portion thereof and having openings facing outward, the liquid crystal panel being bonded to the coupling sections, the plurality of raised sections being respectively received and retained in the plurality of recessed grooves so as to fix the mold frame to the curved backplane, a linear distance between the two coupling sections formed on the two sides of the top portion of the mold frame being shorter than a length of the liquid crystal panel so that the liquid crystal panel is forced by the mold frame to curve in a downward direction to have the liquid crystal panel and the curved backplane show identical curvatures;

wherein the liquid crystal panel comprises a thin-film transistor (TFT) substrate arranged on the coupling sections, a color filter (CF) substrate opposite to the TFT substrate, liquid crystal between the TFT substrate and the CF substrate, an upper polarizer arranged on an upper surface of the CF substrate, and a lower polarizer arranged on a lower surface of the TFT substrate;

wherein the curved liquid crystal display device comprises a light-emitting diode (LED) based direct light source or a cold cathode fluorescent lamp (CCFL) based side-edge light source;

wherein the raised sections have trapezoidal cross-sectional shapes and the recessed grooves have interior spaces corresponding in shape to the raised sections; and wherein the curved backplane is made of a stiff material.

The efficacy of the present invention is that the present invention provides a curved liquid crystal display device, which comprises a liquid crystal panel bonded to a removable mold frame with the mold frame fit to a stiff curved backplane so that the liquid crystal panel is forced by the mold frame to curve in a downward direction, thereby making the liquid crystal panel and the curved backplane show the same curvature. The structure is simple and cost is low and the liquid crystal panel can be made to show a predetermined curvature.

BRIEF DESCRIPTION OF THE DRAWINGS

The technical solution, as well as other beneficial advantages, of the present invention will be apparent from the following detailed description of embodiments of the present invention, with reference to the attached drawing. In the drawing.

DETAILED DESCRIPTION OF THE PREFERRED EMBODIMENTS

To further expound the technical solution adopted in the present invention and the advantages thereof, a detailed description is given to a preferred embodiment of the present invention and the attached drawings.

Figure 1:
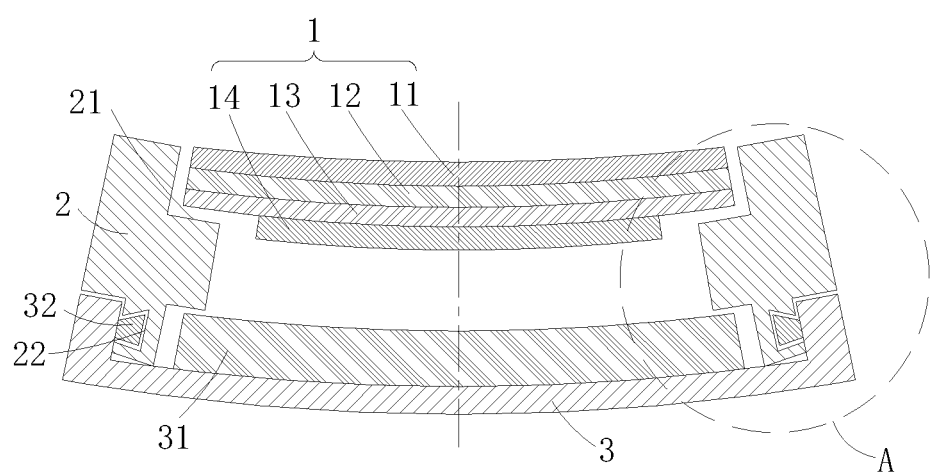
FIG. 1 is a schematic view showing a curved liquid crystal display device according to the present invention.

Referring to FIG. 1, the present invention provides a curved liquid crystal display device, which comprises a curved backplane 3, a light guide plate 31 arranged on the curved backplane 3, a mold frame 2 mounted to the curved backplane 3, and a liquid crystal panel 1 bonded to the mold frame 2.

Figure 2:
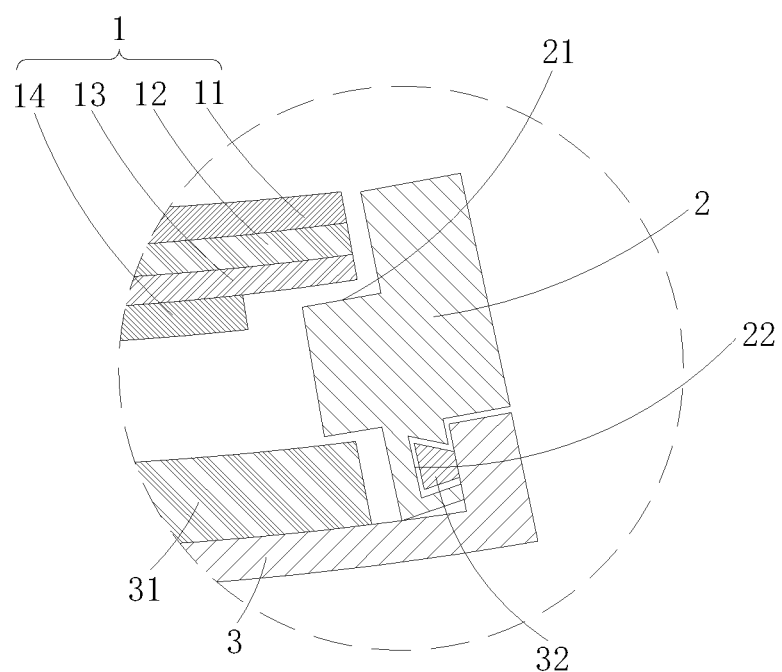
FIG. 2 is an enlarged view of a portion of FIG. 1 marked at A.

Specifically, referring collectively to FIGS. 1 and 2, the curved backplane 3 is in the form of a shell, which has two opposite inside walls that are respectively provided with a plurality of raised sections 32. The mold frame 2 comprises two coupling sections 21 respectively formed at two opposite sides of a top portion thereof and a plurality of recessed grooves 22 formed in two opposite sides of a bottom portion thereof and having openings facing outward. The liquid crystal panel 1 is bonded to the coupling sections 21. The plurality of raised sections 32 are respectively received and retained in the plurality of recessed grooves 22 so as to fix the mold frame 2 to the curved backplane 3. Since a linear distance between the two coupling sections 21 formed on the two sides of the top portion of the mold frame 2 is shorter than a length of the liquid crystal panel 1, when the liquid crystal panel 1 is mounted between the two coupling sections 21 of the mold frame 2, the liquid crystal panel 1 is forced by the mold frame 2 to curve in a downward direction. By selecting a proper ratio between the linear distance between the coupling sections 21 and the length of and the liquid crystal panel 1, the liquid crystal panel 1 can be set to a curvature identical to that of the curved backplane 3.

Further, as shown in FIG. 1, the liquid crystal panel 1 comprises a thin-film transistor (TFT) substrate 13 arranged on the coupling sections 21, a color filter (CF) substrate 12 opposite to the TFT substrate 13, liquid crystal between the TFT substrate 13 and the CF substrate 12, an upper polarizer 11 arranged on an upper surface of the CF substrate 12, and a lower polarizer 14 arranged on a lower surface of the TFT substrate 13.

Preferably, the TFT substrate 13 and the CF substrate 12 are both a glass substrate.

The upper polarizer 11 and the lower polarizer 14 have polarization axis directions perpendicular to each other.

Further, the light guide plate 31 further comprises a series of optic films arranged thereon. The curved liquid crystal display device may use an LED based direct light source or a CCFL based side-edge light source.

The raised sections 32 can be made in the form of a cylinder or having a trapezoidal cross section. Preferably, the raised sections 32 have a trapezoidal cross section. The recessed grooves 22 have interior spaces corresponding in shape to the raised sections 32.

Specifically, the curved backplane is made of a stiff material.

In summary, the present invention provides a curved liquid crystal display device, which comprises a liquid crystal panel bonded to a removable mold frame with the mold frame fit to a stiff curved backplane so that the liquid crystal panel is forced by the mold frame to curve in a downward direction, thereby making the liquid crystal panel and the curved backplane show the same curvature. The structure is simple and cost is low and the liquid crystal panel can be made to show a predetermined curvature.

Based on the description given above, those having ordinary skills of the art may easily contemplate various changes and modifications of the technical solution and technical ideas of the present invention and all these changes and modifications are considered within the protection scope of right for the present invention.

What is claimed is:

1. A curved liquid crystal display device, comprising a curved backplane, a light guide plate arranged on the curved backplane, a mold frame mounted to the curved backplane, and a liquid crystal panel bonded to the mold frame, the curved backplane being in the form of a shell, which has two opposite inside walls that are respectively provided with a plurality of raised sections, the mold frame comprising two coupling sections respectively formed at two opposite sides of a top portion thereof and a plurality of recessed grooves formed in two opposite sides of a bottom portion thereof and having openings facing outward, the liquid crystal panel being bonded to the coupling sections, the plurality of raised sections being respectively received and retained in the plurality of recessed grooves so as to fix the mold frame to the curved backplane, a linear distance between the two coupling sections formed on the two sides of the top portion of the mold frame being shorter than a length of the liquid crystal panel so that the liquid crystal panel is forced by the mold frame to curve in a downward direction to have the liquid crystal panel and the curved backplane show identical curvatures;

wherein the raised sections have trapezoidal cross-sectional shapes and the recessed grooves have interior spaces corresponding in shape to the raised sections.

2. The curved liquid crystal display device as claimed in claim 1, wherein the liquid crystal panel comprises a thin-film transistor (TFT) substrate arranged on the coupling sections, a color filter (CF) substrate opposite to the TFT substrate, liquid crystal between the TFT substrate and the CF substrate, an upper polarizer arranged on an upper surface of the CF substrate, and a lower polarizer arranged on a lower surface of the TFT substrate.

3. The curved liquid crystal display device as claimed in claim 2, wherein the TFT substrate is a glass substrate.

4. The curved liquid crystal display device as claimed in claim 2, wherein the CF substrate is a glass substrate.

5. The curved liquid crystal display device as claimed in claim 2, wherein the upper polarizer and the lower polarizer have polarization axis directions perpendicular to each other.

6. The curved liquid crystal display device as claimed in claim 1, wherein the curved liquid crystal display device comprises a light-emitting diode (LED) based direct light source or a cold cathode fluorescent lamp (CCFL) based side-edge light source.

7. The curved liquid crystal display device as claimed in claim 1, wherein the curved backplane is made of a stiff material.

8. A curved liquid crystal display device, comprising a curved backplane, a light guide plate arranged on the curved backplane, a mold frame mounted to the curved backplane, and a liquid crystal panel bonded to the mold frame, the curved backplane being in the form of a shell, which has two opposite inside walls that are respectively provided with a plurality of raised sections, the mold frame comprising two coupling sections respectively formed at two opposite sides of a top portion thereof and a plurality of recessed grooves formed in two opposite sides of a bottom portion thereof and having openings facing outward, the liquid crystal panel being bonded to the coupling sections, the plurality of raised sections being respectively received and retained in the plurality of recessed grooves so as to fix the mold frame to the curved backplane, a linear distance between the two coupling sections formed on the two sides of the top portion of the mold frame being shorter than a length of the liquid crystal panel so that the liquid crystal panel is forced by the mold frame to curve in a downward direction to have the liquid crystal panel and the curved backplane show identical curvatures;

wherein the liquid crystal panel comprises a thin-film transistor (TFT) substrate arranged on the coupling sections, a color filter (CF) substrate opposite to the TFT substrate, liquid crystal between the TFT substrate and the CF substrate, an upper polarizer arranged on an upper surface of the CF substrate, and a lower polarizer arranged on a lower surface of the TFT substrate;

wherein the curved liquid crystal display device comprises a light-emitting diode (LED) based direct light source or a cold cathode fluorescent lamp (CCFL) based side-edge light source;

wherein the raised sections have trapezoidal cross-sectional shapes and the recessed grooves have interior spaces corresponding in shape to the raised sections; and wherein the curved backplane is made of a stiff material.

9. The curved liquid crystal display device as claimed in claim 8, wherein the TFT substrate is a glass substrate.

10. The curved liquid crystal display device as claimed in claim 8, wherein the CF substrate is a glass substrate.

11. The curved liquid crystal display device as claimed in claim 8, wherein the upper polarizer and the lower polarizer have polarization axis directions perpendicular to each other.

\* \* \* \* \*